United States Patent

[11] 3,592,301

| [72] | Inventor | Reinhard Auth<br>Frankfurt am Main, Germany |
|---|---|---|
| [21] | Appl. No. | 839,256 |
| [22] | Filed | July 7, 1969 |
| [45] | Patented | July 13, 1971 |
| [73] | Assignee | International Telephone and Telegraph Corporation<br>New York, N.Y. |
| [32] | Priority | July 11, 1968 |
| [33] | | Germany |
| [31] | | P 17 75 161.0 |

[54] FLOATING CALIPER DISC BRAKE
16 Claims, 8 Drawing Figs.

[52] U.S. Cl. ................................................ 188/73.6
[51] Int. Cl. ............................................... F16d 65/00
[50] Field of Search.................................... 188/72.3, 73.3, 73.5, 73.6, 205.3

[56] References Cited
UNITED STATES PATENTS

| 3,294,205 | 12/1966 | Schanz | 188/205 (.03) X |
| 3,387,687 | 6/1968 | Eggstein et al. | 188/73.3 X |
| 3,480,116 | 11/1969 | Rath | 188/73.3 |
| 3,493,084 | 2/1970 | Maurice | 188/205 (.3) X |

*Primary Examiner*—George E. A. Halvosa
*Attorneys*—C. Cornell Remsen, Jr., Walter J. Baum and Paul W. Hemminger ABSTRACT: A floating caliper disc bake having a fixed U-shaped mounting frame adapted to fit around the edge of a rotatable brake disc and a brake-caliper assembly carried by the mounting frame and retained by means of springs so that the caliper assembly is relatively free to move in an axial direction while being resiliently restrained in the radial and peripheral directions.

Inventor
Reinhard Auth

Inventor
Reinhard Auth

Inventor
Reinhard Auth ized the present invention comprises a
FLOATING CALIPER DISC BRAKE

BACKGROUND AND SUMMARY OF THE INVENTION

This invention relates to caliper disc brakes and particularly to floating caliper disc brakes in which the caliper assembly is axially movable on its mounting frame.

It is an object of this invention to provide a floating caliper disc brake in which the caliper assembly is resiliently restrained in the radial and peripheral directions while being slidable in an axial direction.

It is a further object of this invention to provide a floating caliper disc brake in which the caliper assembly can easily be removed from the vehicle for maintenance.

It is a further object of this invention to provide a retaining means for a floating brake-caliper assembly which can be easily removed and which is economical to manufacture.

It is a still further object of this invention to provide a single member which can be used to hold a floating caliper assembly in position; cover the caliper access opening; and provide a spring force tending to urge the brake pads away from the brake disc.

In order to achieve these objects the present invention provides a fixed brake-mounting frame having two peripherally spaced bridging sections straddling the edge of the brake discs to form a support or seat on which a caliper assembly may be mounted so that the caliper assembly is free to slide in an axial direction. A U-shaped caliper assembly, comprising a house within which are mounted brake pads and actuating means for forcing the brake pads against the rotating brake disc, is seated on the mounting frame and is held in place by means of springs so that the caliper assembly can slide in an axial direction while being resiliently held in the radial and peripheral directions.

The bridging or support sections are provided with lugs which extend outward in an axial direction and which have openings into which springs are inserted for holding the caliper assembly against the fixed support sections and for preventing movement in a peripheral direction. These lugs can be conveniently formed by bending a portion of the material forming the bridging sections in an outward direction during the manufacture of the brake mounting frame.

The lugs may either be formed on the sides of the bridging sections adjacent to the access opening in the caliper or may be provided on the sides of the bridging section remote from the access opening in the caliper. In the latter case, maximum use of the caliper opening may be made for insertion and removal of the brake pads.

In one embodiment of the invention a space is left between each of the lugs and the caliper assembly to allow for the insertion of a portion of a strip spring formed in the same shape as the opening and provided with a locking tang bent out of the plane of the spring and engageable with a rectangular opening in the lug so as to hold the spring in position. This spring is provided with an arm which extends over the caliper assembly to hold the caliper in position. The spring thereby holds the brake caliper against the brake-mounting frame and resiliently positions it in a peripheral direction. In this embodiment the brake-caliper assembly may be released simply by pressing the locking tang out of the opening in the lug, thereby releasing the spring and caliper assembly. The caliper assembly can then be lifted out of position.

In a variation of this embodiment the two springs are connected by a strip which is substantially the same width as the caliper opening. This provides a single member which locks the caliper in position while also providing a cover for the caliper opening.

This single member may also avoid the necessity of using conventional cross springs to urge the brake pads away from the brake disc when the brakes are not activated. This is accomplished by providing radially inwardly extending spring fingers on the connecting strip over the caliper opening so that the finger lie resiliently against the brake pads to urge the pads outward.

Another embodiment of the invention utilizes a single strip spring which extends across the lugs and the caliper opening. The spring is wider than the lugs and has rectangular openings adjacent to the lugs so that the spring may be pushed down around the lugs and a retaining strip or element inserted in the rectangular openings in the lugs to hold the strip spring in position. The retaining element is somewhat narrower than the rectangular openings in the lugs and is preferably bent to provide a recessed section in the center which prevents the retaining element from sliding out of the opening in the lug after the strip spring is released and prevents the strip spring from moving in a peripheral direction. This construction is particularly advantageous due to the simple and inexpensive construction of the strip spring and retaining element.

DESCRIPTION OF THE PREFERRED EMBODIMENTS

Figure 1:
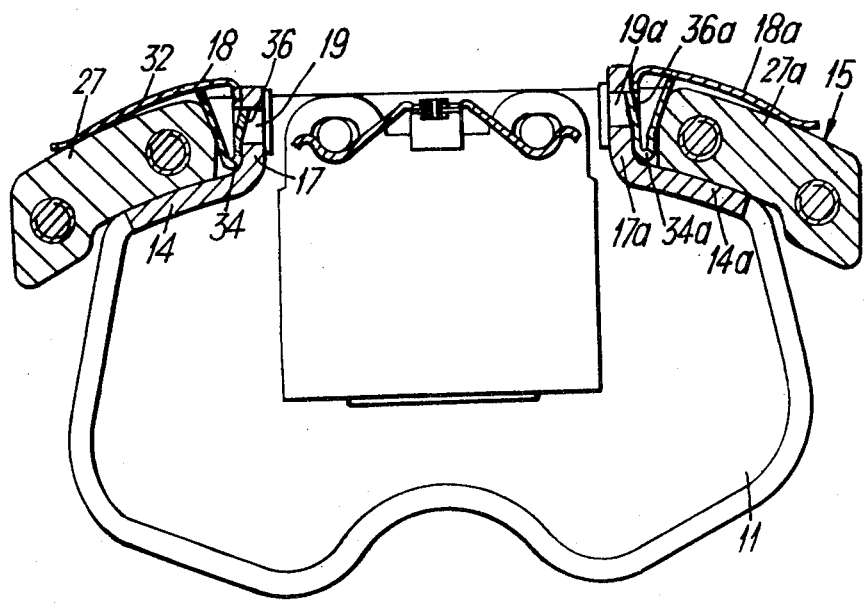
FIG. 1 is an axial sectional view taken on the plane indicated by line I-I of FIG. 2.
Figure 2:
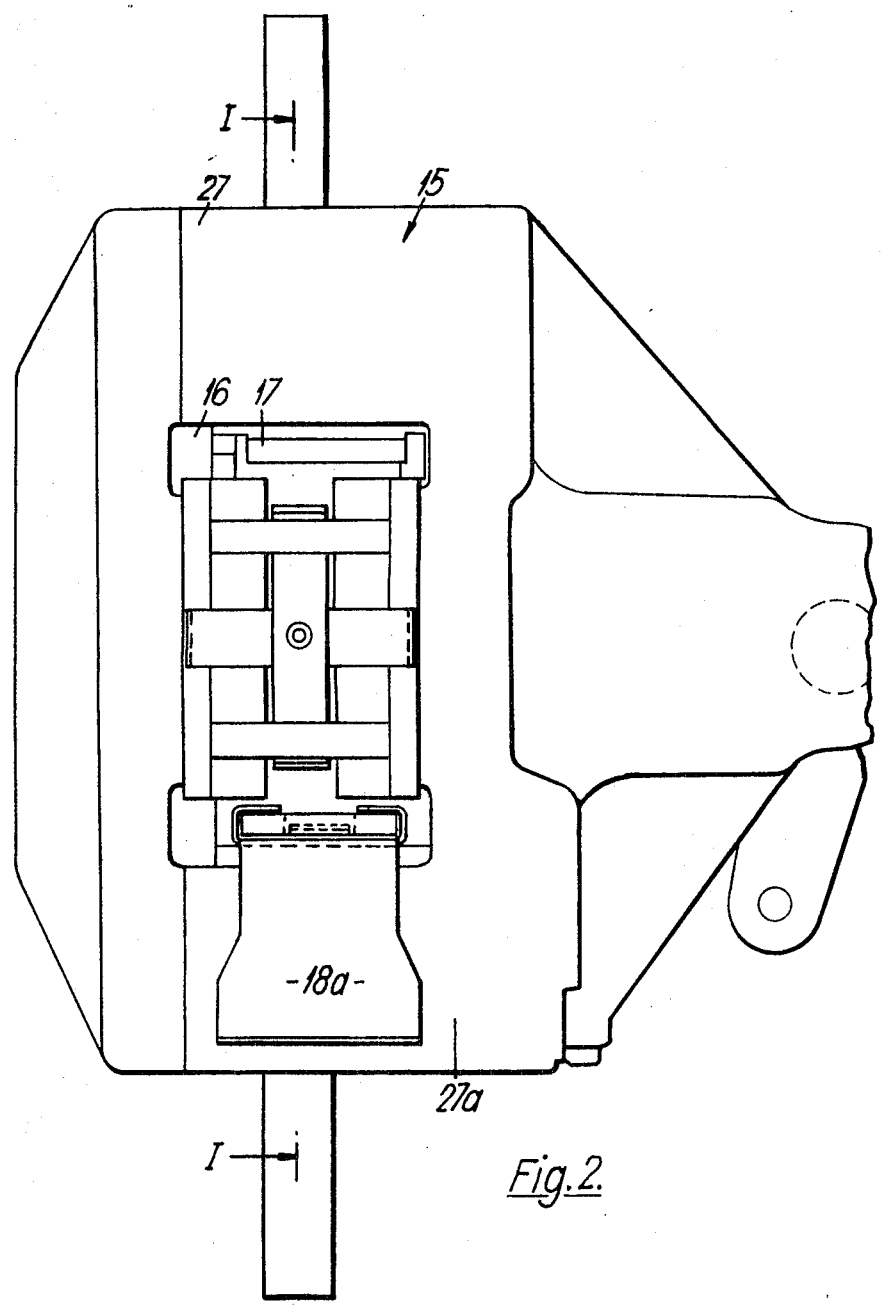
FIG. 2 is a plan view of a floating caliper disc brake embodying the present invention.

As shown in FIGS. 1, 2, 3, and 4 the floating caliper disc brake in accordance with the present invention comprises a fixed U-shaped brake mounting frame 11 which straddles a rotatable brake disc 12 and on which is mounted a brake caliper assembly 15. The parts of the brake-mounting frame arranged on each side of the brake disc 12 are connected by means of two support or bridging sections 14, 14a which are spaced-apart in the peripheral direction and which extend over the edge of the brake disc 12; the top surfaces of the bridging sections serve as bearing surfaces on which the caliper assembly is free to slide in an axial direction. The caliper assembly 15 is constructed in the form of a U-shaped assembly which fits on the brake-mounting frame 11 and which also straddles the brake disc 12. The caliper housing has two peripherally spaced bridging sections 27 and 27a which rest on the bridging sections of the brake-mounting frame.

Figure 3:
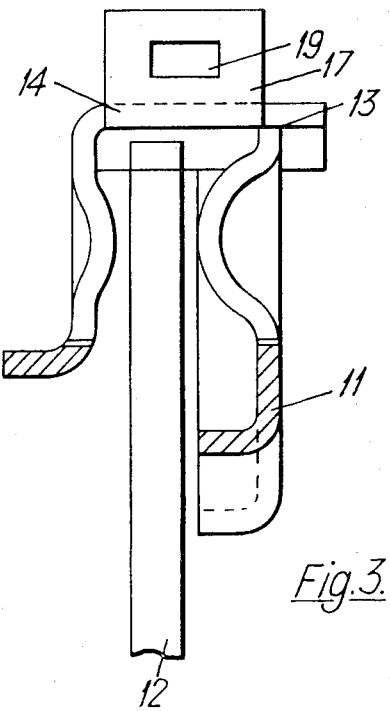
FIG. 3 is a partial radial sectional view of the brake-mounting frame shown in FIG. 1.

As shown in FIG. 3, the brake-mounting frame 11 may be conveniently manufactured from two separately produced parts which are butt-welded together along line 13.

Lugs 17 and 17a are bent radially outwards from the bridging sections 14 and 14a and extend through the caliper opening 16 of the brake-caliper assembly 15 after the latter has been placed in position on the brake-mounting frame 11.

Figure 4:
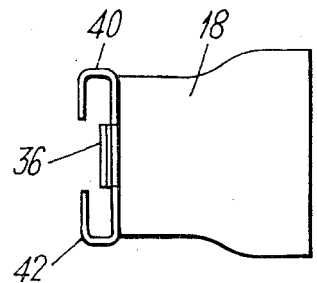
FIG. 4 is a plan view of a strip spring shown in FIG. 1.

As shown in FIG. 1 strip springs 18 and 18a are provided for holding the brake-caliper assembly 15 on the brake-mounting frame 11. The construction and assembly of the right side of the brake caliper and holder being identical with the left side as seen in FIG. 1 only one side will be described in detail. The strip spring 18 has a spring arm 32 for holding the caliper assembly in position against the top of the bridging sections 14 and 14a and a V-shaped section 34 which is inserted into the space between the lug 17 and the caliper housing bridging section 27. In order to prevent the V-shaped section 34 from springing out of the space between the lug 17 and the caliper housing bridging section 27, a locking tang 36 is pressed out of the plane of the strip spring and fits into a rectangular opening 19 in the lug 17 to hold the spring in place. By inserting a screwdriver into the opening 19 the locking tang 36 can be easily brought out of engagement with the opening 19 to release the strip spring. In this manner the strip spring shown in this embodiment holds down the brake-caliper assembly 15 while at the same time positioning it in the peripheral direction. As shown in FIG. 4 the strip spring is provided with laterally bent parts 40 and 42 which nest around the lug 17 to position the strip spring 18.

Figure 5:
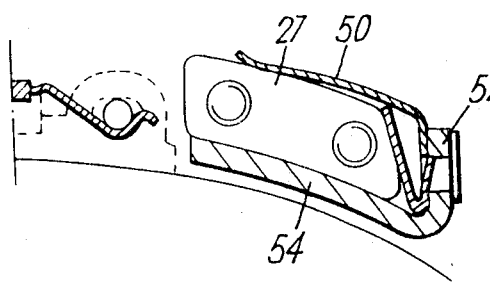
FIG. 5 is a partial axial sectional view of another embodiment of the invention.

FIG. 5 shows an embodiment of the invention similar to FIGS. 1 through 4 in which the mounting frame lugs are on the outside of the bridging sections rather than the inside. A V-shaped section 48 of a strip spring 50 is inserted into the space between the lug 52 on the outside of bridging section 54 and the bridging section 27 of the caliper assembly. An identical construction, not shown, holds the other side of the caliper assembly. The function and construction of the strip spring is similar to that shown in FIG. 1.

Figure 6:
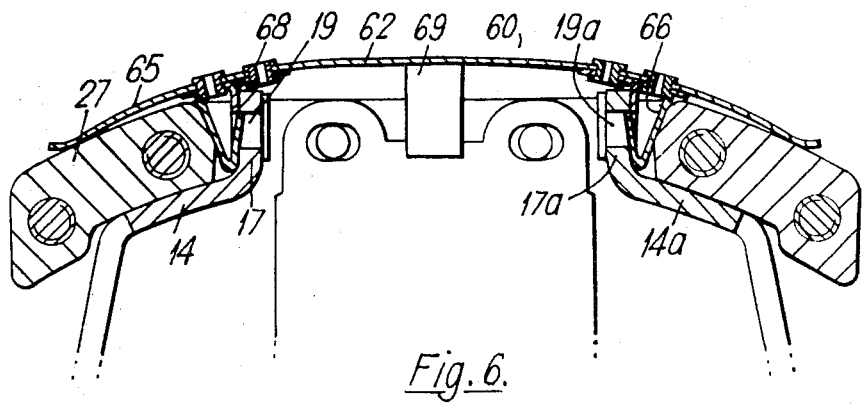
FIG. 6 is a partial axial sectional view of a modification of the embodiment shown in FIG. 1.

FIG. 6 shows a modification of the embodiment of FIG. 1. In this embodiment a single member 60 serves as a spring for holding the caliper assembly in position and a cover for the caliper opening 16. A center section 62 is attached to two end pieces 65 and 66 each of which is similar to and functions in the same manner as the strip springs 18 and 18a of FIG. 1, to form a single member 60 covering both the caliper opening 16 and the caliper-bridging sections 27 and 27a. The center sections may be attached to the end pieces by rivets 68 or by other suitable means. In this embodiment of the invention a separate cross spring for pressing the brake pads away from the brake disc can be eliminated. Inwardly extending fingers 69 which are formed on the sides of center section 62 of the spring make resilient contact with the brake pads to urge the pads outward.

Figure 7:
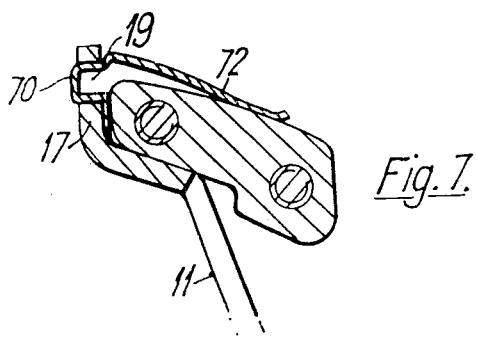
FIG. 7 is a partial axial sectional view showing another embodiment of the present invention.

FIg. 7 shows an embodiment of the invention in which the strip spring is retained by means of a resilient projection 70 formed in the strip spring 72. The projection engages the rectangular opening 19 in the lug 17.

Figure 8:
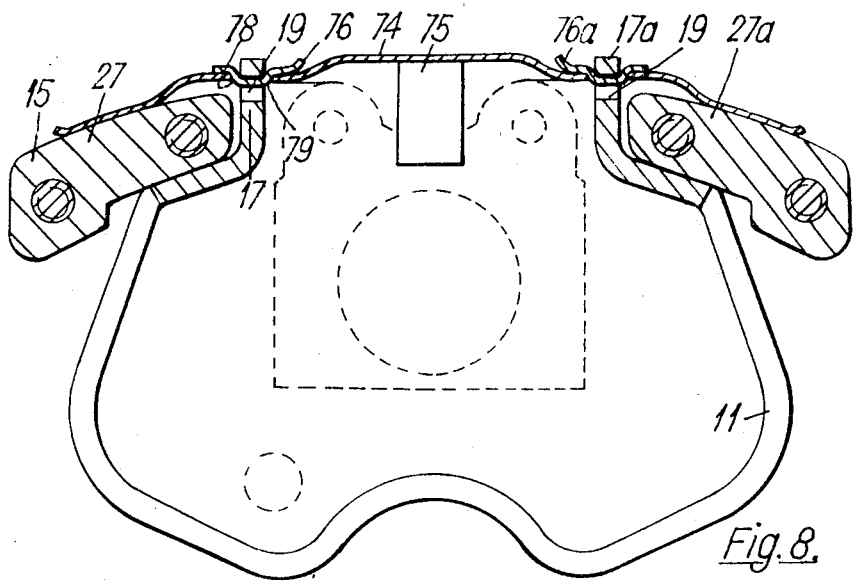
FIG. 8 is a partial axial sectional view of another embodiment of this invention.

Another embodiment of this invention is shown in FIG. 8 where, as in FIG. 6 a one-piece holding spring is provided which extends over the whole arrangement from one caliper-bridging section to the other. At a position adjacent to the lugs 17 and 17a, the holding spring 74 has rectangular openings which are somewhat wider than the width of the lugs 17 and 17a. After placing the brake caliper 15 assembly in position on the brake-mounting frame 11 the spring 74 can be pressed downward with its openings fitted over the lugs 17 and 17a until the openings in the spring are below the openings 19 and 19a of the lugs 17 and 17a so that retaining strips or elements 76 and 76a can be inserted into the openings 19 and 19a.

When the holding spring 74 is then released it will abut against the retaining strips 76 and 76a which in turn are pressed against the upper edges of the openings 19 and 19a thereby holding the spring 74 in position. Each retainer strips has two bends 78 and 79 so that the openings in the holding spring 74 will be above the top of the openings 19 and 19a in the lugs 17 and 17a in the assembled position, thereby trapping the retaining strips. This also keeps the holding spring 74 at one peripheral position.

It will be obvious that the holding spring 74 can be removed simply by pressing downward on the holding spring 74 and withdrawing the retaining strips 76 and 76a.

In this embodiment of the invention, as in that shown in FIG. 6, resilient spring fingers 75 attached to the center section of the holding spring 74 replace the separate cross springs usually necessary to urge the brake pads apart.

Replacement of the brake pads in each of the embodiments shown herein is extremely simple.

In the case of a construction in accordance with FIG. 6 and 8, the first step is that of releasing the caliper-holding spring. Then the brake-pad holding pins are drawn out and the brake pads can be removed. By releasing the caliper-holding spring the caliper itself is also released.

In the case of construction in accordance with the other figures, it is not necessary to release the caliper-holding springs. The pads can be replaced simply by drawing out the pad-holding pins without releasing the caliper from the brake-mounting frame. It is also possible to lift out the complete caliper assembly including the brake pads, the brake-pad holding pins and the cross spring, by simply releasing the caliper-holding springs from the brake-mounting frame.

It will be appreciated that the invention illustrated and described herein may be modified by those skilled in that art without deviating from the spirit and scope of the invention as set forth in the following claims.

I claim:

1. A floating caliper disc brake comprising:
   a rotatable brake disc;
   a U-shaped brake-mounting frame fixed with respect to the rotatable brake disc having two peripherally spaced bridging sections straddling the brake disc, the top of the bridging sections forming a bearing surface on which a caliper assembly may freely move in an axial direction,
   each bridging section having a lug thereon extending in a radial direction with means on the lug for attaching a spring, the lug and the frame being a monophyletic structure;
   a U-shaped caliper assembly adapted to fit around the edge of the brake disc having two peripherally spaced bridging sections supported on the bridging sections of the mounting frame; and
   a spring connected between each of said lugs and the caliper assembly resiliently holding the caliper assembly against radial and peripheral movement while allowing the caliper assembly to slide in an axial direction on the bridging sections of the mounting frame.

2. The floating caliper disc brake of claim 1 wherein the means on the lugs for attaching said springs are openings in the face of the lug and the springs are strip springs, each having means for attaching the spring to the opening in the face of one of the lugs and a resilient arm for holding the brake caliper assembly against the brake-mounting frame bridging sections.

3. The floating caliper disc brake of claim 2 wherein the strip springs have laterally bent arms which nest around the lugs.

4. The floating caliper disc brake of claim 2 wherein the lugs are on the sides of the brake-mounting frame bridging sections which are remote from the opening between the bridging sections.

5. The floating caliper disc brake of claim 2 wherein the lugs are on sides of the brake-mounting frame bridging sections which are adjacent to the opening between the bridging sections.

6. The floating caliper disc brake of claim 5 wherein the strip springs are formed from a single strip of monophyletic resilient material covering the opening between the caliper assembly bridging sections and having arms extending over the caliper bridging sections, the spring having opening through which the lugs extend, and the means for attaching the spring are retaining elements which are inserted in the lug openings to hold the spring in place.

7. The floating caliper disc brake of claim 2 wherein there are gaps between the lugs and the bridging sections of the caliper assembly and the strip spring each have a V-shaped section which is insertable in the gap to resiliently hold the caliper assembly in the peripheral direction, the V-shaped section having an outwardly extending locking tang which engages the top of the lug opening when the V-shaped section of the strip spring is pushed into the gap, thereby locking the strip spring in position.

8. The floating caliper disc brake of claim 7 wherein the strip springs are connected to form a single spring assembly having a strip in the center covering the opening between the caliper assembly bridging sections.

9. The floating caliper disc brake of claim 8 wherein there are laterally bent arms on the spring assembly which nest around each of the lugs.

10. The floating caliper disc brake of claim 8 wherein there are radially extending spring fingers extending from strip spring into the opening between the bridging sections of the caliper assembly for urging the caliper assembly brake pads away from the brake disc.

11. The floating caliper disc brake of claim 2 wherein the strip springs are formed from a single strip of monophyletic resilient material covering the opening between the caliper assembly bridging sections and having arms extending over the caliper bridging sections, the spring having openings through which the lugs extend, and the means for attaching the springs are retaining elements which are inserted in the lug openings to hold the spring in place.

12. The floating caliper disc brake of claim 11 wherein each retaining element has arms extending over the strip spring and a recess in the center which engages the top of the opening in the lug to prevent disengagement of the retaining element and peripheral movement of the spring.

13. The floating caliper disc brake of claim 11 wherein there are radially extending spring fingers extending from strip spring into the opening between the bridging sections of the caliper assembly for urging the caliper assembly brake pads away from the brake disc.

14. A floating caliper disc brake comprising:
a rotatable brake disc;
a brake-mounting frame fixed with respect to the rotatable brake disc and having at least one support section extending over the edge of the brake disc, the top of the support section forming a bearing surface on which caliper assembly may slide in an axial direction and the support section having a lug thereon extending in a radial direction with means on the lug for attaching a spring, the lug and the frame being a monophyletic structure;
a brake caliper assembly carried by the brake-mounting frame comprising a U-shaped housing adapted to fit around the edge of the brake disc and brake pads and actuating means mounted in the housing; and
a spring means connected between said lug and the caliper assembly resiliently holding the caliper against radial and peripheral movement with respect to the brake mounting frame while permitting sliding in an axial direction on the support section.

15. The floating caliper disc brake of claim 14 wherein the means on the lug for attaching a spring is an opening in the face of the lug and the spring is a strip spring attached to said lug having a spring arm to hold the caliper assembly against the support section.

16. The floating caliper disc brake of claim 15 wherein said strip spring has means thereon for resiliently holding the caliper assembly against peripheral movement.